United States Patent [19]

Steffier

[11] Patent Number: 5,558,907
[45] Date of Patent: Sep. 24, 1996

[54] PSEUDO-POROUS FIBER COATING FOR TOUGHENED CERAMIC COMPOSITE MATERIALS AND METHOD OF PRODUCING SAME

[75] Inventor: Wayne S. Steffier, Huntington Beach, Calif.

[73] Assignee: Hyper-Therm High Temperature Composites, Inc., Huntington Beach, Calif.

[21] Appl. No.: 525,846

[22] Filed: Sep. 8, 1995

Related U.S. Application Data

[62] Division of Ser. No. 132,671, Oct. 6, 1993, Pat. No. 5,480,707.

[51] Int. Cl.$^6$ ..................................... B05D 3/02
[52] U.S. Cl. .................. 427/227; 427/228; 427/249; 427/255.1; 427/255.2; 427/255.7
[58] Field of Search ................................ 427/227, 228, 427/249, 255.1, 255.2, 255.7

[56] References Cited

U.S. PATENT DOCUMENTS

| | | |
|---|---|---|
| 4,397,901 | 8/1983 | Warren . |
| 4,605,588 | 8/1986 | Simpson et al. . |
| 4,642,271 | 2/1987 | Rice . |
| 4,752,503 | 6/1988 | Thebault . |
| 4,772,524 | 9/1988 | Coblenz . |
| 4,869,943 | 9/1989 | Corbin et al. . |
| 4,885,199 | 12/1989 | Corbin et al. . |
| 4,935,387 | 6/1990 | Beall et al. . |
| 4,948,758 | 8/1990 | Beall et al. . |
| 5,026,604 | 6/1991 | Thebault . |

*Primary Examiner*—James J. Bell
*Attorney, Agent, or Firm*—Coudert Brothers

[57] ABSTRACT

A fiber-reinforced ceramic composite material exhibiting high tensile strength, high fracture toughness and high-temperature oxidation resistance is produced by simultaneously depositing a thin coating layer of refractory metal carbide with fugitive carbon onto the fiber reinforcement prior to the subsequent densification with the ceramic matrix. The energy behind propagating matrix cracks in the resulting composite material are effectively dissipated by crack deflection/branching, fiber debonding and frictional slip through the relatively weak and compliant fiber coating layer. These energy release and arrest mechanisms sufficiently impede the driving force behind unstable crack propagation and render the cracks non-critical, thereby serving to blunt and/or divert propagating matrix cracks at or around the reinforcing fiber. While significantly increasing the strength and fracture toughness of the composite, the compliant refractory fiber coating system enables the composite to remain oxidatively stable when stressed at or beyond the matrix cracking stress point and subsequently exposed to temperatures above 800° C. in air,

9 Claims, No Drawings

PSEUDO-POROUS FIBER COATING FOR TOUGHENED CERAMIC COMPOSITE MATERIALS AND METHOD OF PRODUCING SAME

This is a division of application Ser. No. 08/132,671 filed Oct. 6, 1993 now U.S. Pat. No. 5,420,707.

FIELD OF THE INVENTION

The present invention relates to a toughened, oxidation resistant ceramic composite material composed of a refractory fiber reinforcement, a relatively weak and compliant pseudo-porous refractory fiber coating system which protects the reinforcing fibers from advancing matrix cracks, and a ceramic matrix.

BACKGROUND OF THE INVENTION

In general, ceramics have superior high-temperature strength and modulus, lower density, and lower thermal conductivity than metallic materials. The principal disadvantages of ceramics as structural materials are their relatively low failure strain, low fracture toughness and catastrophic brittle failure characteristics. Because of these intrinsic limitations, monolithic ceramics lack the properties of reliability and durability that are necessary for structural design acceptance. However, by incorporating high strength, relatively high modulus fibers into brittle ceramic matrices, high strength/high toughness composites can be obtained. Successfully tailored ceramic-matrix composites exhibit highly non-linear stress-strain behavior with ultimate strengths, failure strains and fracture toughnesses substantially greater than that of the unreinforced matrix.

It is well known that in order to exploit the benefits of fiber-reinforced ceramic-matrix composites, a relatively weak fiber/matrix interfacial bond strength is necessary to prevent catastrophic failure from propagating matrix cracks. The interface must provide sufficient fiber/matrix bonding for effective load transfer, but must be weak enough to debond and slip in the wake of matrix cracking while leaving the fibers to bridge the cracks and support the far-field applied load. Currently available fiber coatings such as carbon and boron nitride have demonstrated the desired mechanical characteristics necessary to enhance the composite strength and toughness, however the utility of these composites are severely limited by their susceptibility to oxidation embrittlement and strength degradation when stressed at or beyond the matrix cracking stress point and subsequently exposed to high-temperature oxidation. This fundamental limitation is due to the accelerated environmental degradation of the fiber coating at elevated temperatures in air following the onset of matrix cracking.

The following patents disclose ceramic composites which suffer from the foregoing limitations: U.S. Pat. No. 4,397,901 to Warren discloses a ceramic coating on a ceramic fiber to accommodate a thermal expansion mismatch. U.S. Pat. No. 4,935,387 and U.S. Pat. No. 4,948,758, both to Beall et al., disclose a sheet silicate coating on the fibers which promotes fiber pull-out by cleavage failures between crystal sheets. U.S. Pat. No. 4,869,943 and U.S. Pat. No. 4,885,199, both to Corbin et al., disclose toughening a ceramic matrix with a fiber coating such as pyrolytic carbon or other material which differs either in morphology or chemistry from the fiber and the matrix, thereby providing a crack deflection zone. U.S. Pat. No. 4,772,524 to Coblenz discloses a fibrous monolith, not a fiber/matrix composite, in which the planes of weakness between adjacent fibers deflect advancing cracks in the monolith. U.S. Pat. No. 4,642,271 to Rice and U.S. Pat. No. 4,605,588 to Simpson et al., both disclose a boron nitride coating on ceramic fibers. Rice discloses that the coated fibers are in a matrix and the fiber coating promotes fiber pull-out. U.S. Pat. No. 4,752,503 and U.S. Pat. No. 5,026,604, both to Thebault disclose a laminar pyrolytic carbon and boron nitride fiber coating having a thickness between 0.2 and 3 microns and a greater failure elongation than the matrix for increased impact strength.

SUMMARY OF THE INVENTION

The object of the present invention is to mitigate the fundamental limitations of current carbon and boron nitride fiber coatings through the use of a weak and compliant pseudo-porous refractory fiber coating system. The pseudo-porous refractory fiber coating system is intrinsically oxidation resistant at elevated temperatures and is tailored by the control of excess uncombined carbon in the microstructure in such a way as to provide the necessary mechanical and physical characteristics to enhance the strength and toughness of the resulting ceramic-matrix composite. According to the invention, the fiber coating is produced by simultaneously depositing a single thin layer of carbide ceramic material with fugitive carbon onto the fiber reinforcement texture prior to the subsequent densification with the ceramic matrix.

In the present invention, a process is described for the manufacture of a toughened, oxidation resistant ceramic composite material composed of a refractory fiber reinforcement, a pseudo-porous refractory fiber coating system, and a ceramic matrix.

Refractory fibers are defined as any fibers, continuous or discontinuous, which are capable of withstanding a temperature of at least 800° C. in an atmosphere which is thermochemically compatible with that fiber without suffering fundamental chemical, physical or mechanical degradation-for example, carbon fibers, silicon carbide fibers, aluminum oxide fibers, etc.

Pseudo-porous fiber coating system is defined as any refractory composition of metal carbide, which is co-deposited (for example by chemical vapor deposition) simultaneously with fugitive carbon onto the refractory fibers in such a way as to produce a metal carbide coating which is saturated with excess uncombined carbon so as to produce a weakened and compliant, pseudo-porous microstructure which fully encapsulates the reinforcing fibers.

Fugitive carbon is defined as an excess of uncombined carbon which is simultaneously deposited with the carbide ceramic fiber coating, the purpose of which is to produce a discrete carbon phase within the microstructure of the carbide ceramic coating layer, thereby serving to reduce both the strength and stiffness of the resulting ceramic fiber coating. Because of the extreme strength and elastic stiffness mismatch between the fugitive carbon phase and the carbide ceramic, the fugitive carbon may be volatilized by high-temperature oxidation prior to use or in-situ without degrading the thermomechanical performance of the finished composite.

Ceramic matrix is defined as any refractory composition of metal carbide, nitride, boride, silicide, or oxide which is subsequently deposited (for example by chemical vapor deposition) onto the previously coated refractory fibers thereby encapsulating and densifying the refractory fiber preform.

Chemical vapor deposition (CVD) is defined as the process in which a solid ceramic or carbon material is deposited at elevated temperature and typically reduced pressure from gaseous and/or vaporized liquid precursors.

Fiber preform is defined as a reinforcing texture produced by weaving, braiding, fiber placement, winding, felting, or other textile process.

DETAILED DESCRIPTION OF THE INVENTION

By methods of CVD, the fiber coating system is produced by simultaneously depositing a single thin concentric layer of refractory carbide ceramic material, such as silicon carbide or other refractory metal carbide, with fugitive carbon onto the fiber reinforcement texture prior to the subsequent densification with the ceramic matrix. By saturating the carbide ceramic with excess carbon, a microstructural phase separation between the ceramic and the carbon can be obtained due to the limited solubility of carbon in refractory metal carbides such as silicon carbide. The excess carbon phase present in the carbide ceramic emulates the characteristics of porosity due to the extreme elastic stiffness mismatch between the two constituents, resulting in decreasing the strength and stiffness of the ceramic fiber coating. More importantly, this pseudo-porosity can be tailored and graded by controlling the precursor feed gas proportions during deposition to yield the most desired mechanical and physical characteristics for optimum composite strength, toughness and oxidation resistance performance.

The compliant and relatively weak mechanical characteristics of the pseudo-porous fiber coating system provide fracture impeding mechanisms which prevent unstable coplanar matrix crack propagation. The pseudo-porous refractory fiber coating provides sufficient bonding resistance for load transfer between the fiber and matrix, but is weak enough to debond and slip during the matrix crack propagation process. The fracture energy behind propagating matrix cracks in the resulting composite material are thus effectively dissipated by crack deflection/branching, fiber debonding and frictional slip through the pseudo-porous ceramic fiber coating layer, thereby serving to blunt and/or divert propagating matrix cracks at or around the reinforcing fiber. While significantly increasing the strength and toughness of the composite, the pseudo-porous refractory coating system enables the composite to remain oxidatively stable when stressed at or beyond the matrix cracking stress point and subsequently exposed to temperatures above 800° C. in air.

According to the process of the present invention, a reinforcing preform is first produced by weaving, braiding, fiber placement, winding, felting, or other textile process using refractory fibers such as carbon, silicon carbide, aluminum oxide, or other fiber capable of withstanding temperatures of at least 800° C. The dry fiber-preform is then fixtured and compacted in a holding tool so as to maintain the desired fiber volume fraction by controlling the preform thickness prior to subsequent composite processing.

The initial processing step is the application of a 50–500 angstrom layer of carbon coating on the fixtured fiber preform to protect the fibers from potentially detrimental chemical interaction with the subsequent ceramic coating and/or ceramic coating process chemistries during deposition. The CVD-applied carbon chemical barrier coating is produced by the pyrolytic decomposition of a hydrocarbon gas such as methane ($CH_4$) at elevated temperature and reduced pressure.

The second processing step is the application of a 0.5–5.0 micron layer of carbon-enriched carbide ceramic coating, such as silicon carbide or other refractory metal carbide, by known methods of CVD co-deposition. The strength and stiffness characteristics of the resulting fiber coating are controlled by the off-stoichiometric feed gas proportions of the carbon-forming and metal carbide ceramic-forming precursors used during deposition. Higher percentages of fugitive carbon in the deposit result in greater levels of uncombined carbon enrichment. The excess fugitive carbon phase in the deposit emulates the characteristics of porosity due to the extreme elastic mismatch between the two constituents, resulting in lowering both the strength and stiffness of the refractory metal carbide fiber coating.

The third and final processing step is the matrix consolidation of the fibrous preform. The coated fiber preform, still fixtured in a tool, is then infiltrated and consolidated with a suitable ceramic matrix obtained by CVD. During the densification process, the fiber preform remains fixtured until an initial level of ceramic matrix is deposited to adequately rigidize or harden the preform. Following the matrix rigidization process, the hardened preform is removed from the holding tool and further densifted in the free standing state until the desired bulk density of the composite is obtained. The result is a toughened ceramic composite material composed of a refractory fiber reinforcement, an oxidation resistant pseudo-porous refractory fiber coating system which protects the reinforcement from advancing matrix fractures propagating directly through the fibers, and a ceramic matrix.

EXAMPLE 1–3

Three (3) reinforcing preforms were fabricated by stacking 8 plies of 8-harness satin woven silicon carbide (SiC) fabric (ceramic-grade Nicalon® produced by Nippon Carbon Co,, Ltd., Japan and marketed in the United States by Dow Corning Corp., Midland, Mich.) in a cross-ply $(0/90)_{2s}$ orientation. The laminated preforms were then fixtured and compacted in graphite holding tools so as to maintain a fiber volume fraction of nominally 35–40% by controlling the preform thickness prior to subsequent composite processing. The initial processing step was the application of a 100–200 angstrom layer of fugitive pyrolytic carbon (PyC) coating on the fixtured preforms to protect the Nicalon® fibers from known thermochemical degradation during subsequent silicon carbide CVD processing. The CVD-applied PyC chemical barrier coating was produced by the pyrolytic decomposition of methane $CH_4$ at a temperature of 1050° C. and a total pressure of 15 torr. The second processing step was the application of a 2.5 micron layer of carbon-enriched SiC produced by the simultaneous pyrolytic decomposition of $CH_4$ and thermal decomposition of vaporized methyltrichlorosilane (MTS) using hydrogen as a carrier gas in the CVD reactor at a temperature of 1025° C. and a total pressure of 5 torr. Three (3) laminated preforms were separately processed using three (3) different $CH_4$/MTS precursor feed gas mixture ratios so as to produce three (3) varying degrees of carbon-enrichment in the resulting SiC fiber coating systems. The greater the $CH_4$/MTS ratio, the greater the percentage of uncombined carbon in the microstructure of the SiC fiber coating and, thus, the greater the degree of pseudo-porosity resulted in the respective fiber coating deposits. This process enabled controlling the degree of pseudo-porosity in the refractory fiber coating system for the purpose of evaluating for the most viable fiber coating system in terms of the final composite mechanical and high-temperature oxidative stability performance.

Following the application of the pseudo-porous SiC fiber coating system, the laminated preforms were infiltrated and consolidated with a SiC matrix produced by CVD to an average bulk density of 2.5 gm/cm$^3$. The corresponding residual porosity in the completed ceramic composites was about 12%. The resulting ceramic composite materials consisted of an 8-ply woven Nicalon® SiC fabric reinforcement, a pseudo-porous SiC fiber coating system of three (3) various degrees of pseudo-porosity via fugitive carbon enrichment, and a SiC matrix. Mechanical test specimens were machined from the densified composite panels and further processed with a final SiC CVD application to mitigate any microstructural damage incurred by machining. The average bulk density of the completed ceramic composite test specimens after the final CVD application was 2.53 gm/cm$^3$.

Uniaxial tensile tests were performed to establish the mechanical characteristics of the three (3) composite material systems at room-temperature, following isothermal conditioning at 1000° C. in air for 24 hours, and following pre-cracking the specimens at a tensile stress of approximately twice that of the matrix cracking strength and subjecting the specimens to an exposure at 1000° C. in air for 24 hours. Table 1 summarizes the room-temperature results of this evaluation for Examples 1–3 specimens of toughened fiber-reinforced ceramic-matrix composite material of the present invention as a function of the degree of carbon enrichment in the SiC fiber coating system, or pseudo-porosity. Table 2 summarizes the results for Examples 1–3 specimens following an isothermal exposure of 1000° C. in air for 24 hours. Table 3 summarizes the results for Examples 1–3 specimens following pre-cracking the specimens in tension and subjecting the specimens to an exposure at 1000° C. in air for 24 hours.

TABLE 1

Room-Temperature Tensile Properties* of Nicalon® SiC Fiber-Reinforced SiC Matrix Composites Incorporating an Oxidation Resistant Pseudo-Porous SiC Fiber Coating System

| Tensile Property | Units | Refractory Fiber Coating System | | |
|---|---|---|---|---|
| | | Porous SiC$^1$ | Porous SiC$^2$ | Porous SiC$^3$ |
| Matrix Cracking Strength | MPa | 77.0 (3.8) | 73.6 (6.6) | 68.3 (15.6) |
| Ultimate Strength | MPa | 228.9 (8.3) | 218.8 (7.6) | 198.3 (10.0) |
| Failure Strain | % | 0.48 (0.09) | 0.51 (0.06) | 0.42 (0.16) |
| Initial Elastic Modulus | GPa | 201.6 (12.6) | 227.8 (26.4) | 232.4 (27.5) |
| Number of Tests | — | 5 | 5 | 5 |

*Average Value (Standard Deviation)
$^1$Highly Pseudo-Porous SiC Fiber Coating
$^2$Moderately Pseudo-Porous SiC Fiber Coating
$^3$Lightly Pseudo-Porous SiC Fiber Coating

TABLE 2

Post-Isothermal Exposure* Tensile Properties** of Nicalon® SiC Fiber-Reinforced SiC Matrix Composites Incorporating an Oxidation Resistant Pseudo-Porous SiC Fiber Coating System

| Tensile Property | Units | Refractory Fiber Coating System | | |
|---|---|---|---|---|
| | | Porous SiC$^1$ | Porous SiC$^2$ | Porous SiC$^3$ |
| Matrix Cracking Strength | MPa | 55.6 (5.9) | 46.0 (10.1) | 67.6 (30.8) |
| Ultimate Strength | MPa | 216.3 (12.3) | 200.7 (10.7) | 200.9 (12.8) |
| Failure Strain | % | 0.47 (0.06) | 0.40 (0.04) | 0.42 (0.09) |
| Initial Elastic Modulus | GPa | 201.3 (32.1) | 233.7 (34.3) | 228.7 (55.9) |
| Number of Tests | — | 5 | 5 | 5 |

*1000° C. in air for 24 hours
**Average Value (Standard Deviation)
$^1$Highly Pseudo-Porous SiC Fiber Coating
$^2$Moderately Pseudo-Porous SiC Fiber Coating
$^3$Lightly Pseudo-Porous SiC Fiber Coating

TABLE 3

Post-Stressed Oxidation* Tensile Properties** of Nicalon® SiC Fiber-Reinforced SiC Matrix Composites Incorporating an Oxidation Resistant Pseudo-Porous SiC Fiber Coating System

| Tensile Property | Units | Refractory Fiber Coating System | | |
|---|---|---|---|---|
| | | Porous SiC$^1$ | Porous SiC$^2$ | Porous SiC$^3$ |
| Pre-Cracking Stress | Mpa | 118.6 (1.0) | 120.9 (2.3) | 121.8 (2.1) |
| Ultimate Strength | MPa | 181.6 (18.1) | 176.7 (17.2) | 174.9 (2.1) |
| Failure Strain | % | 0.31 (0.08) | 0.29 (0.10) | 0.27 (0.01) |
| Initial Tangent Modulus | GPa | 140.7 (17.3) | 149.4 (40.5) | 223.6 (57.6) |
| Number of Tests | — | 5 | 5 | 5 |

*Pre-Cracked in Tension and Exposed to 1000° C. in air for 24 hours
**Average Value (Standard Deviation)
$^1$Highly Pseudo-Porous SiC Fiber Coating
$^2$Moderately Pseudo-Porous SiC Fiber Coating
$^3$Lightly Pseudo-Porous SiC Fiber Coating

What is claimed is:

1. A method of making a ceramic composite material comprising the following steps:

(a) preparing a fibrous preform and placing the preform in a CVD reactor;

(b) coating the fibrous preform with a 50–500 angstrom layer of carbon;

(c) coating the fibrous preform with a a 0.5–5.0 micron layer of carbon-enriched carbide ceramic coating over the layer of carbon; and (d) consolidating the fibrous preform by infiltrating the preform with a ceramic matrix material and densifying the preform.

2. The method of claim 1, wherein the fibrous preform is fixtured in a conforming graphite tool so as to maintain the desired fiber volume fraction and component geometry.

3. The method of claim 1 wherein the layer of carbon is produced by CVD using a suitable carbon-forming precursor such as methane, propane or mixtures thereof which is pyrolytically decomposed into carbon at an elevated temperature of 800°–1200° C. and a reduced pressure of 1–100 Torr.

4. The method of claim 3, wherein the fibrous preform is coated with a 50–500 angstrom layer of fugitive carbon to protect the vulnerable reinforcing fibers from potential chemical degradation from the subsequent ceramic coating deposition process chemistries.

5. The method of claim 1, wherein the pseudo-porous ceramic fiber coating layer is produced by the simultaneous CVD of fugitive carbon and carbide ceramic using suitable carbon- and carbide ceramic-forming precursor mixtures in combination, such as methyltrichlorosilane and methane or silicon tetrachloride and methane (for the formation of carbon-enriched SiC, for example), which are thermally decomposed into the desired carbon-enriched carbide ceramic material at an elevated temperature of 800°–1200° C. and a reduced pressure of 1–100 Torr.

6. The method of claim 5, wherein the fugitive carbon-enriched carbide ceramic coating layer comprising the pseudo-porous fiber coating system is maintained within a thickness range of 0.5–5.0 microns.

7. The method of claim 1, wherein the ceramic matrix is produced by CVD using a suitable ceramic-forming precursor or precursor combination, such as methyltrichlorosilane or silicon tetrachloride and methane (for the formation of SiC, for example), which is thermally decomposed into the desired ceramic material at an elevated temperature of 800°–1200° C. and a reduced pressure of 1–100 Torr.

8. The method of claim 7, wherein the ceramic matrix fully encapsulates the reinforcing fibers and the pseudo-porous fiber coating system thereby consolidating the fibrous preform into a dense, free-standing ceramic composite article.

9. The method of claim 1 wherein the layer of carbon used to prevent the chemical degradation of reinforcing fibers during the CVD fiber coating process, and the uncombined carbon phase with the microstructure of the pseudo-porous carbide ceramic fiber coating may be volatilized by high-temperature oxidation following the consolidation of the composite with the ceramic matrix.

* * * * *